US005365467A

United States Patent [19]

Fujita et al.

[11] Patent Number: 5,365,467

[45] Date of Patent: Nov. 15, 1994

[54] SIGNAL PROCESSOR FOR PROVIDING VARIABLE ACOUSTIC EFFECT

[75] Inventors: Yoshio Fujita; Kazuhisa Okamura, both of Hamamatsu, Japan

[73] Assignee: Yamaha Corporation, Japan

[21] Appl. No.: 171,116

[22] Filed: Dec. 21, 1993

[30] Foreign Application Priority Data

Dec. 25, 1992 [JP] Japan .................................. 4-347367

[51] Int. Cl.[5] .......................... G06F 7/38; G10H 7/12

[52] U.S. Cl. ...................................... 364/723; 84/607

[58] Field of Search ................... 364/723; 84/604–607

[56] References Cited

U.S. PATENT DOCUMENTS 5,146,834 9/1992 Izumisawa et al. ................. 364/723

5,298,672 3/1994 Gallitzendörfer .................. 364/723

*Primary Examiner*—Tan V. Mai

*Attorney, Agent, or Firm*—Graham & James

[57] ABSTRACT

A musical tone signal processor is included of a computation unit, a register, a controller and an interpolator, and imparts a variable acoustic effect to a musical tone signal. The computation unit repeatedly executes a cycle of computation steps applied to the musical tone signal, using a plurality of parameters so as to realize a desired acoustic effect. The register stores values of the respective parameters which are used individually in corresponding computation steps. The controller operates when a variation is requested in the acoustic effect for designating at least one registered parameter attributive to the requested variation so as to rewrite an old value of the designated parameter to a new value. The interpolator is responsive to the execution of the computation steps each cycle during a transient period of the variation for feeding synchronously to the computation unit an intermediate value of the designated parameter, which is interpolated progressively from the old value to the new value, to thereby ensure the smooth variation in the acoustic effect. The interpolator has a multiple of interpolation channels. A multiple of concurrently designated parameters can be assigned freely to the respective interpolation channels so as to carry out parallel interpolation of the designated parameters.

4 Claims, 7 Drawing Sheets

FIG.7

| IRATE | Increment rate (binary) |
|---|---|
| 7 | ( D I R E C T ) |
| 6 | 1 0 0 0 0 0 0 |
| 5 | 1 0 0 0 0 0 |
| 4 | 1 0 0 0 0 |
| 3 | 1 0 0 0 |
| 2 | 1 0 0 |
| 1 | 1 0 |
| 0 | 1 |

SIGNAL PROCESSOR FOR PROVIDING VARIABLE ACOUSTIC EFFECT

BACKGROUND OF THE INVENTION

The present invention relates to a digital signal processor (DSP) installed in an electronic musical instrument or else for imparting a variable acoustic effect to a musical tone signal.

In the electronic musical instrument, the DSP carries out computation processings of a digital waveform of the musical tone signal to realize the acoustic effect such as echo. vibrato and so on. The DSP operates according to a given microprogram comprised of a plurality of computation steps. Conventionally, the DSP is provisionally set with fixed parameters or coefficients which are used in the respective computation steps.

Recently, it has been attempted to update the parameters of the DSP in real time basis in order to instantly vary the acoustic effect imparted to the tone signal during the course of musical performance. However, in order to update concurrently all the parameters used in a great number of the computation steps of the DSP, correspondingly a great number of registers are required and disadvantageously the operation of the DSP is complicated. Further, at the time of updating the parameters, the parameter values must be incrementally interpolated by an interpolator during a transient period in order to avoid sudden and irregular variation in the acoustic effect. However, in order to completely interpolate all of the numerous parameters. disadvantageously a large scale of the interpolator is required.

SUMMARY OF THE INVENTION

In order to solve the above noted drawbacks of the prior art, an object of the invention is to realize selective interpolation of parameters to be updated.

According to the present invention, a signal processing apparatus comprises computation means for executing computation processing of a waveform of a given signal, using a plurality of parameters, register means for registering values of the respective parameters, designating means for designating at least one of the parameters, rewriting means for rewriting the designated parameter from an old value to a new value, and interpolation means for feeding to the computation means an intermediate value of the designated parameter, which is interpolated progressively from the old value to the new value, wherein the interpolation means includes means defining a multiple of interpolation channels, a number of which is less than a total number of the parameters, and means for selectively assigning the designated parameter to one of the interpolation channels to carry out interpolation of the designated parameter.

In a specific form, an apparatus for imparting a variable acoustic effect to a musical tone signal, comprises computation means for repeatedly executing a cycle of computation steps applied to the musical tone signal, using a plurality of parameters so as to realize a desired acoustic effect, register means for registering values of the respective parameters which are used individually in corresponding computation steps, designating means operative when a variation is requested in the acoustic effect for designating at least one registered parameter attributive to the requested variation, rewriting means for rewriting the designated parameter from an old value to a new value, and interpolation means responsive to the execution of computation steps each cycle during a transient period of the variation for feeding synchronously to the computation means an intermediate value of the designated parameter, which is interpolated progressively from the old value to the new value, to thereby ensure the smooth variation in the acoustics effect, wherein the interpolation means includes means defining a multiple of interpolation channels, and means for assigning a multiple of concurrently designated parameters freely to the interpolation channels so as to carry out parallel interpolation of the designated parameters.

In the inventive apparatus, the respective parameters are stored in the register means for use in the corresponding computation steps. Desired ones of the registered parameters are designated and rewritten to a new value from an old value. During the transient period, each of the designated parameters is incrementally interpolated from the old value to the new value to thereby smoothly alter the designated parameters attributive to the variation in the acoustic effect. Only the attributive parameters can be processed through the multiple of the interpolation channels in parallel manner. The parameters to be updated may be freely designated, or alternatively a particular group of the parameters may be qualified provisionally for the designation.

BRIEF DESCRIPTION OF THE DRAWINGS

FIG. 7 is a table diagram showing the relation between an interpolation rate and an incremental rate.

DETAILED DESCRIPTION OF THE INVENTION

Figure 1:
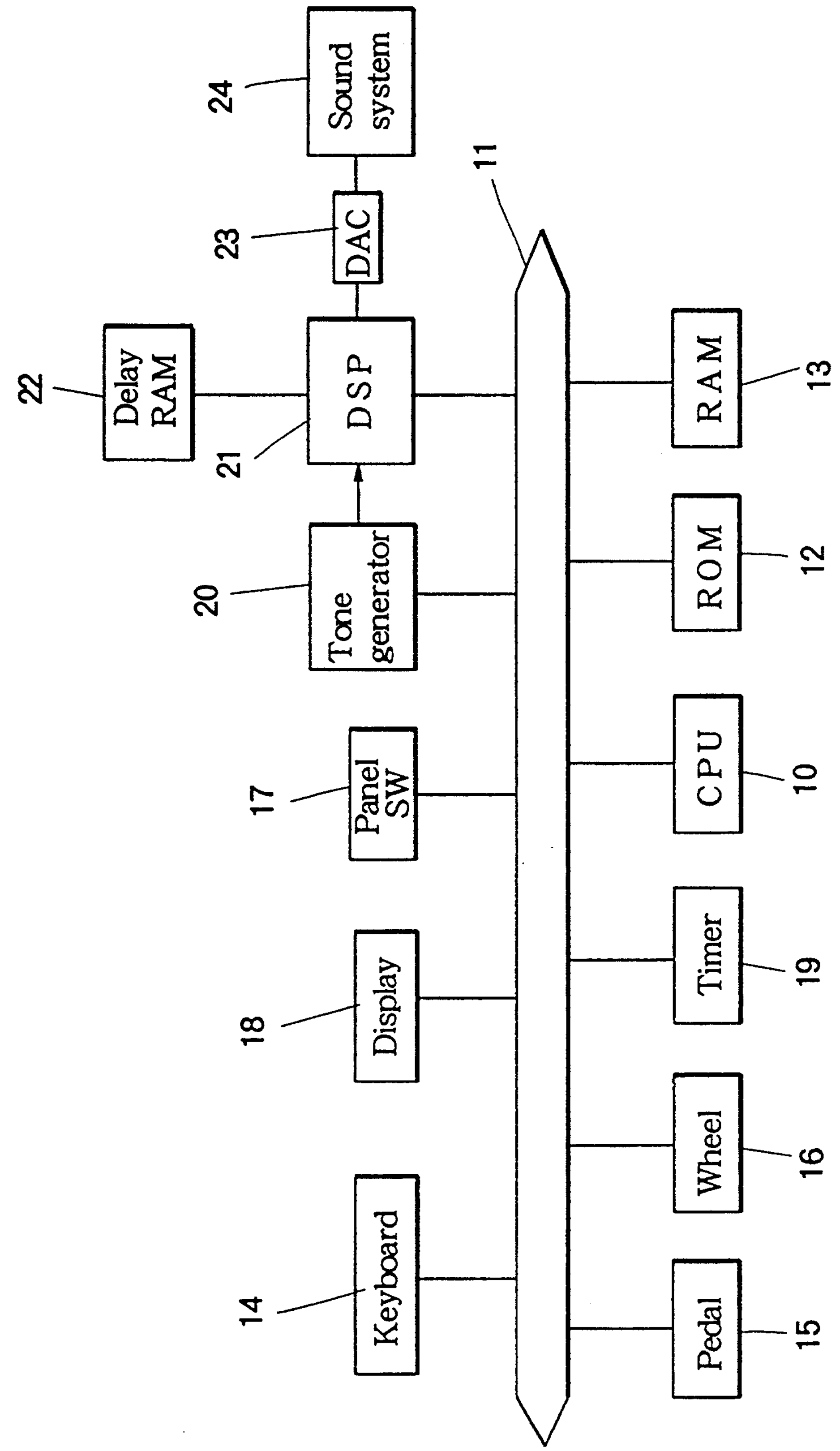
FIG. 1 is a system block diagram showing an electronic musical instrument provided with a DSP according to the invention.

FIG. 1 is a system block diagram showing one embodiment of an electronic musical instrument provided with a digital signal processor (DSP) according to the present invention. The system includes a CPU 10 connected through a bus line 11 to those of ROM 12, RAM 13, keyboard 14, pedal 15, wheel 16, panel switch 17, display 18, timer 19, tone generator 20 and DSP 21. The ROM 12 stores a control program for controlling entire operation of the electronic musical instrument. The RAM 13 stores various data, for example, representative of performance information inputted by means of operating implements such as the keyboard 14 and the pedal 15. The keyboard 14 has, for example, 61 number of keys which cover a pitch range of five octaves. The pedal 15 is a foot implement which produces an analog performance data proportional to a tread angle. The wheel 16 is a hand implement for generating a modulation data proportionally to a rotation angle thereof. The performance information inputted by the respective implements is memorized in given areas of the RAM 13.

The panel switch 17 and the display 18 are installed on an operating panel. The panel switch 17 is actuated to request or input desired acoustic timbre and acoustic effect for the DSP 21, while the display 18 indicates the inputted or requested information. The timer 19 is utilized for counting a given tempo during the course of automatic performance. The tone generator 20 may be selected from either of a wave sampling tone generator and an FM tone generator.

The DSP 21 is a digital circuit for imparting a variable acoustic effect to a musical tone signal generated by the tone generator 20. The DSP 21 contains a computation unit operative in combination with a separate delay RAM 22 and else to process the digital musical tone signal, thereby imparting thereto a desired acoustic effect such as echo and vibrato. The DSP 21 is controlled by numerous parameters (coefficients), some of which are set and updated by the CPU 10 in real time basis according to the performance information such as initial or after touch on the keyboard 14, a tread amount of the pedal 15 and a rotation amount of modulation wheel. A digital-to-analog converter (DAC) 23 is connected to the DSP 21 for converting a digital tone waveform data outputted by the DSP 21 into an analog tone signal. A sound system 24 receives the converted analog tone signal, and amplifies the same to emit a musical sound by means of a loud speaker or else.

Figure 2:
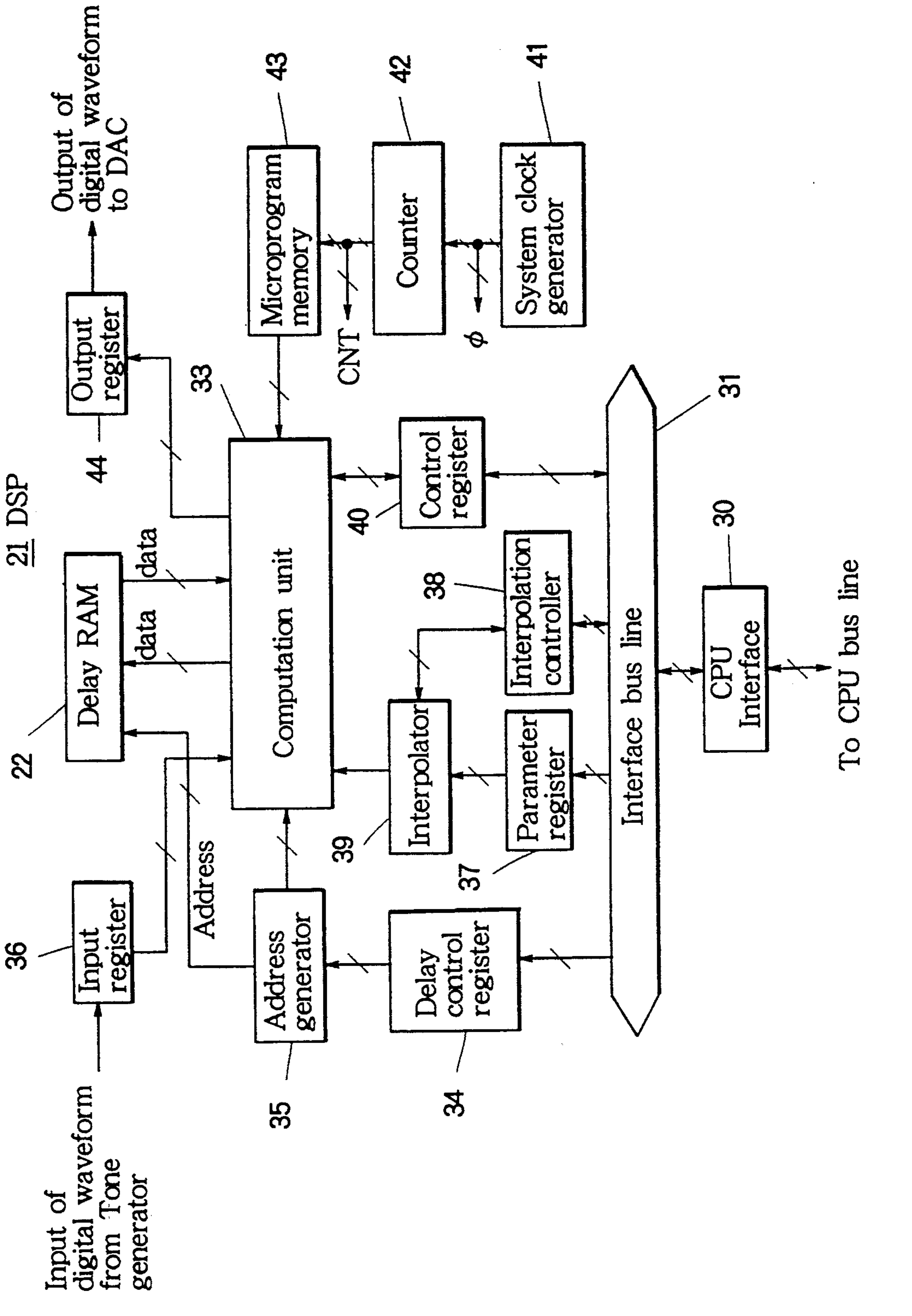
FIG. 2 is a block diagram showing overall construction of the DSP.

FIG. 2 shows a detailed block diagram of the DSP 21. The DSP 21 is provided with a computation unit 33 which receives a tone signal having a digital waveform inputted from the tone generator 20 through an input register 36. The computation unit 33 digitally processes the input tone signal in cooperation with the delay RAM 22 according to 256 computation steps of a given microprogram and parameters or coefficients provided from various internal registers to thereby realize a desired acoustic effect. A digital waveform of the processed tone signal by the computation unit 33 is transferred to the DAC through an output register 44. Each of the 256 computation steps utilizes one parameter typically in the form of a coefficient. All the utilized parameters are provisionally set into a parameter register 37 prior to operation start of the DSP 21, for example, when the instrument system is turned on, or when a desired acoustic effect is selected and set. In this embodiment, 16 number of parameters can be selectively and concurrently updated while being smoothly interpolated, among the whole set of 256 parameters.

The DSP 21 contains other registrative units than the aforementioned registers 36, 37 and 44. Namely, an address generator 35 is provided for feeding an address signal effective to access the delay RAM 22 so as to effect delay operation of a digital waveform. An interpolator 39 is provided for injecting each parameter into the computation unit 33. A control register 40 is provided for registering other control data. A microprogram memory 43 is provided for storing the microprogram used in the computation unit 33.

The address generator 35 is connected to an interface bus line 31 through a delay control register 34. The delay control register 34 feeds to the address generator 35 a delay command effective to determine a delay amount by the delay RAM 22 between the inputted tone waveform and the outputted tone waveform. The address generator 35 operates based on the delay command to generate the address signal effective to control writing and reading operation of the delay RAM 22 by means of the computation unit 33. Namely, the computation unit 33 operates according to the address signal to successively write the tone waveform data into the delay RAM 22 in response to every sampling clock, and to successively read out the written tone waveform data from the delay RAM 22 in delayed manner timed by a certain clock number determined by the delay amount. Therefore, the delay RAM 22 functions as a shift register. The delay command is provided from the CPU 10 through the main bus line 11 (FIG. 1), the CPU interface 30 and the interface bus line 31.

The microprogram memory 43 stores the microprogram composed of 256 microcodes corresponding to the 256 computation steps. Each microcode is designated by a step count CNT of 8-bit value. Each microcode commands the computation unit 33 to execute one sequence or step of the digital processing including tone waveform data input operation, memory data writing operation, memory data reading operation, arithmetic operation, tone waveform data output operation and parameter admission operation. An 8-bit counter 42 is connected to an address terminal of the microprogram memory 43. Further, a system clock generator 41 is connected to a clock terminal of the counter 42 generate a system clock $\phi$ which has a frequency sufficiently higher than that of the sampling clock, since the numerous steps of the microprogram must be executed one cycle during one sampling dock period. The counter 42 operates in response to the system clock $\phi$ to generate the step count CNT in cyclic manner from 0 to 255. Namely, the counter 42 returns to "1" everywhen the same is reset by overflow. The microprogram memory 43 is accessed by the sequential step count CNT to thereby feed to the computation unit 33 microcode corresponding to the sequential step count CNT. Consequently, the count CNT designates the computation step.

The parameter register 37 stores the parameters used in the computation of the respective steps of the microprogram, and has memory areas corresponding to the respective steps for registering all the 256 number of the parameters. The CPU 10 writes the parameters into the register 37, while the interpolator 39 reads out the stored parameters from the register 37. The CPU 10 addresses all the memory areas at the start of the operation to load thereinto the 256 number the parameters. During the course of the operation, the CPU 10 selectively addresses an individual memory area to update a stored parameter in real time basis.

Figure 5:
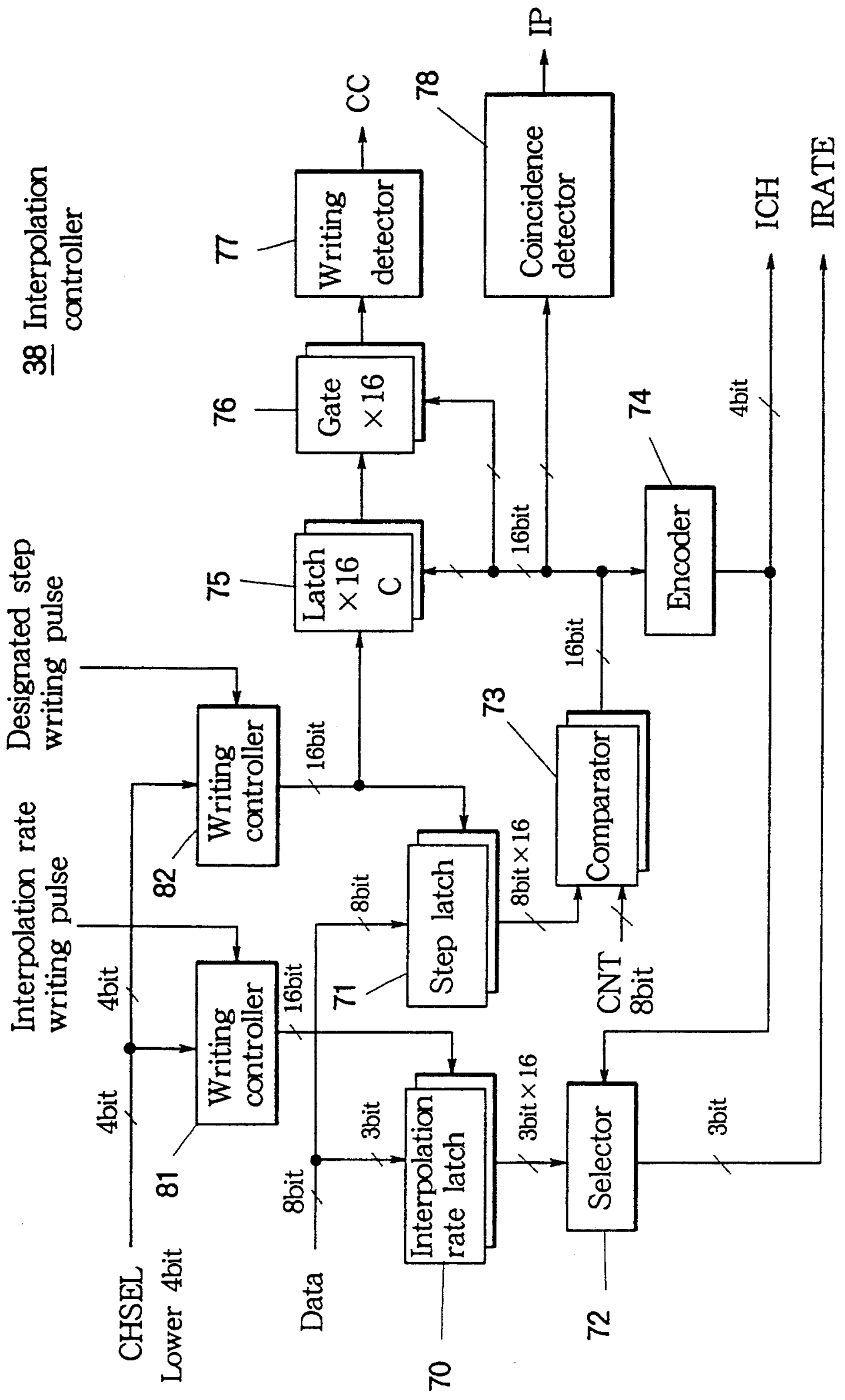
FIG. 5 is a detailed block diagram showing an interpolation controller provided in the DSP.

The interpolator 39 successively injects into the computation unit 33 individual parameters which are used the respective computation steps of the microprogram. The interpolator 39 is connected to those of the parameter register 37 and an interpolation controller 38. The interpolator 39 operates at an unchanging step where an involved parameter is kept as it is for passing the existing parameter from the parameter register 37 to the computation unit 33. Alternatively, the interpolator 39 operates at a changing step where an involved parameter is changed or updated for carrying out incremental interpolation in real time basis between an old value (start value) of the parameter previously taken from the parameter register 37 and a new value (target value) of the same parameter newly taken from the register 37, according to an interpolation rate stored in the interpolation controller 38 to thereby provide an intermediate value of the parameter between the old and new values, to the computation unit 33 during a transient The interpolator 39 has 16 number of parallel channels for concurrently interpolatively alter different parameters associated to at most 16 number of steps in real time basis. The user can freely designate a changing step where the involved parameter is interpolatively updated in real time basis. The changing step may be selected so as to effectively realize a desired variation in the acoustic effect. The selection or designation of the changing step is conducted by the CPU 10 to input, into the parameter register 37 and the interpolation controller 38, a command data including a step number, a channel number, an interpolation rate and so The channel number assigns any available one of sixteen channels which independently execute interpolation in parallel manner. The channel number is circulated as a channel select signal CHSEL in the DSP 21 so as to designate the channel during latching operation of the interpolation rate and the step number. The step number designates the changing step associated to the assigned channel, and is circulated as a step select signal in the DSP 21. The step number is latched in the assigned channel of a step latch 71 (FIG. 5). The interpolation rate is latched in the assigned channel of an interpolation rate latch 70 (FIG. 5) of the interpolation controller 38. The changing step is selected according to the currently working microprogram such that the changing step is most attributive to achieve a desired acoustic effect and timbre by changing or updating the associated parameter. The new value of the updated parameter is determined according to the performance information inputted by the implements such as the pedal, the modulation wheel and an after-touch sensor of the keyboard. The channel number is selected to designate a vacant one of 16 number of the channels, which currently is not working for interpolation of the parameters. The designated channel carries out the interpolation of the parameter specified by the command data, and generates an EQ signal when the interpolation is finished. This EQ signal is latched in a corresponding area of a latch 54 (FIG. 3) within the CPU interface 30. The CPU 10 reads out the EQ signal held in the latch 54 through a buffer 56 to thereby detect that the designated channel has finished the interpolation operation. Accordingly, this channel is opened for a next interpolation operation of another parameter. Further, after finishing the transitional processing of the updated parameter, the command data may be erased by the CPU 10 so as to free the channel for other use of computation than the interpolation.

Figure 3:
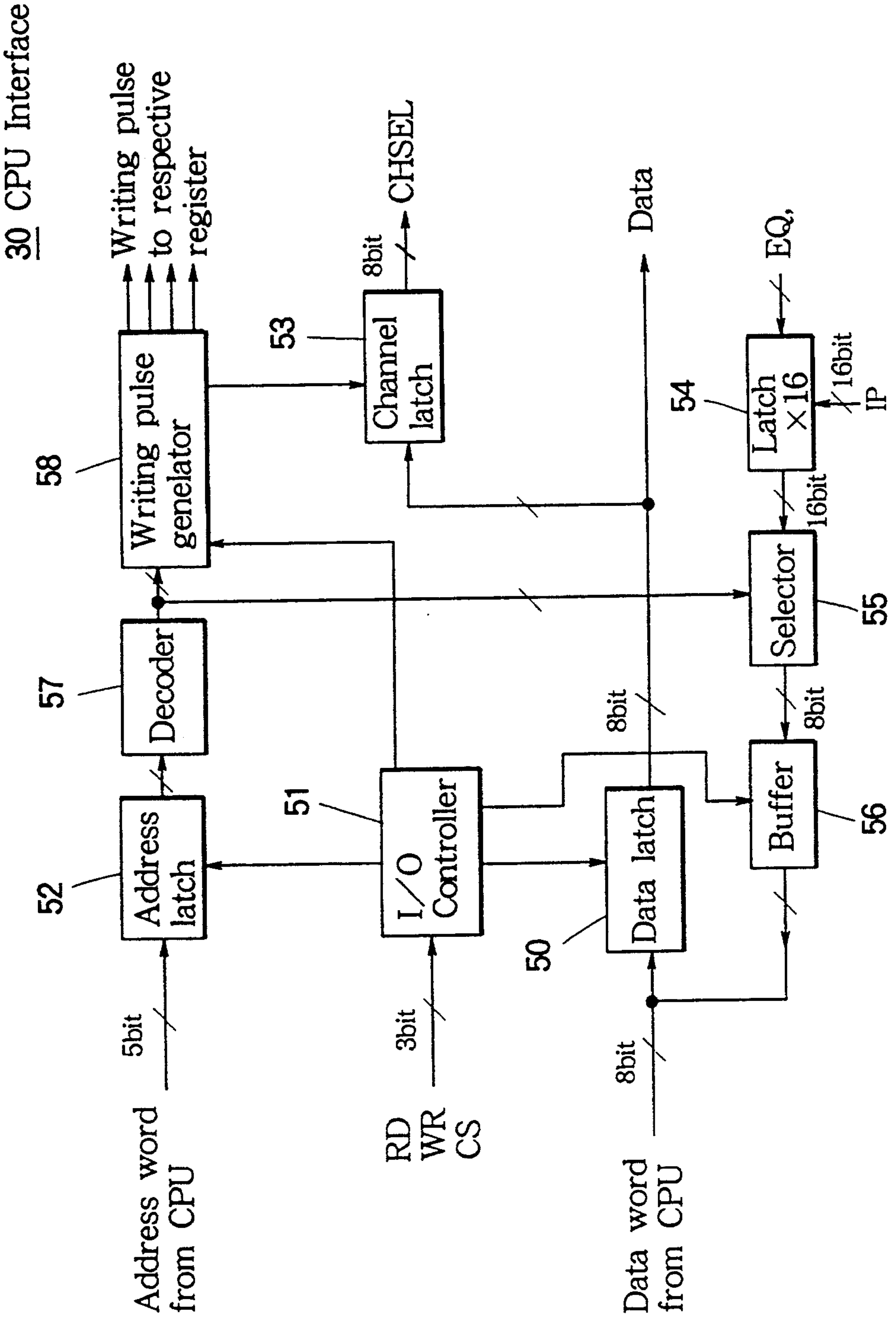
FIG. 3 is a detailed block diagram showing a CPU interface provided in the DSP.

FIG. 3 shows a detailed block diagram of the CPU interface 30. The CPU interface 30 is a circuit for distributing various data words and address words inputted from the CPU bus line 11 (FIG. 1) to adequate registers at adequate locations. The CPU 10 provides a general 8-bit address word in which upper order three bits are converted into a chip select signal CS by means of a 3–8 decoder (not shown). When a particular set of the upper order three bits enters into the 3–8 decoder, the active signal CS is directed to a chip of the DSP 21. This signal CS is received by an I/O controller 51. The I/O controller 51 receives a writing signal WR and a reading signal RD concurrently with the active chip select signal CS. When the signals CS and WR are inputted, the I/O controller 51 outputs a latch pulse to those of a data latch 50 and an address latch 52. On the other hand, when the signals CS and RD are inputted, the I/O controller 51 outputs a latch pulse to the address latch 52, and outputs an enable signal to the buffer 56.

When the latch pulse is outputted, lower order five bits of the delivered address word is latched into the address latch 52. The set of lower order five bits constitutes an address code indicative of the respective registers in the DSP 21. This five-bit address code is fed to a decoder 57. The decoder 57 notifies to a writing pulse generator 58 a particular register identified by the 5-bit address code. The writing pulse generator 58 outputs a writing pulse to the identified register when a trigger signal is inputted from the I/O controller 51. The I/O controller 51 transmits the trigger signal at a certain timing in taking account of a delay clock number so that a corresponding data word admitted in the data latch 50 is distributed to the identified register in time. The writing pulse may be directed to a latch 60 and a writing controller 62 within the parameter register 37, writing controllers 81,82 within the interpolation controller 38, and registers within the control register 40.

The data word fed from the CPU bus line 11 is latched into the data latch 50. The CPU 10 inputs the data words representative of the aforementioned command data including the channel number and step number, and other data, those of which are outputted to the interface bus line 31 (FIG. 2) as data to be written which will be delivered to the various registers 34, 37, 38, 40 and else.

When designating a changing step where the associated parameter is to be interpolated, the CPU 10 writes a channel number into a channel latch 53 of the CPU interface 30, then writes an interpolation rate and a corresponding step number, respectively, into the interpolation rate latch 70 and the step latch 71 (FIG. 5). By such a sequence of the writing operation, the command data is set into the interpolation controller 38 according to the following procedure.

As shown in FIGS. 3 and 5, the channel number written in the channel latch 53 is fed to the writing controllers 81,82 of the interpolation controller 38, in the form of the channel select signal CHSEL. Subsequently, the interpolation rate fed from the CPU 10 is delivered to the interpolation rate latch 70 through the data latch 50. Concurrently, the writing pulse generator 58 outputs an interpolation rate writing pulse to the writing controller 81. At this moment, the writing controller 81 receives the channel select signal CHSEL so that the writing controller 81 outputs a latch pulse to a particular section of the interpolation rate latch 70, corresponding to a channel designated by the channel select signal CHSEL. Consequently, the provided interpolation rate is written into the particular one of 16 sections of the interpolation rate latch 70, associated to the designated channel.

The writing operation for the step latch 71 is carried out in manner similar to the interpolation rate latch 70. The provided step number is written into one of 16 number sections of the step latch 71, corresponding to the channel designated by the channel select signal CHSEL. By such a manner, the interpolation rate and the step number are set for the designated channel so as to complete a preparatory operation of the interpolation by the designated channel for a particular parameter associated to the changing step specified by the latched step number.

Thereafter, when the CPU 10 updates the particular parameter to a new value, the interpolator 39 starts interpolation of the particular parameter through the designated channel progressively according to the set interpolation rate. During the progressive interpolation, the interpolator 39 initially outputs a start value identical to the old value of the parameter at the first cycle, and the outputs an intermediate value gradually approaching the new value at the specified interpolation rate. Lastly when the outputted value reaches the target value, the interpolation is finished to hold the new value thereafter. At the end of the interpolation, the signal EQ is generated, which is latched by the latch 54 of the CPU interface 30. The CPU 10 reads out the latched signal EQ through the selector 55 and the buffer 56 to thereby detect the end timing of the interpolation at the designated channel.

Figure 4:
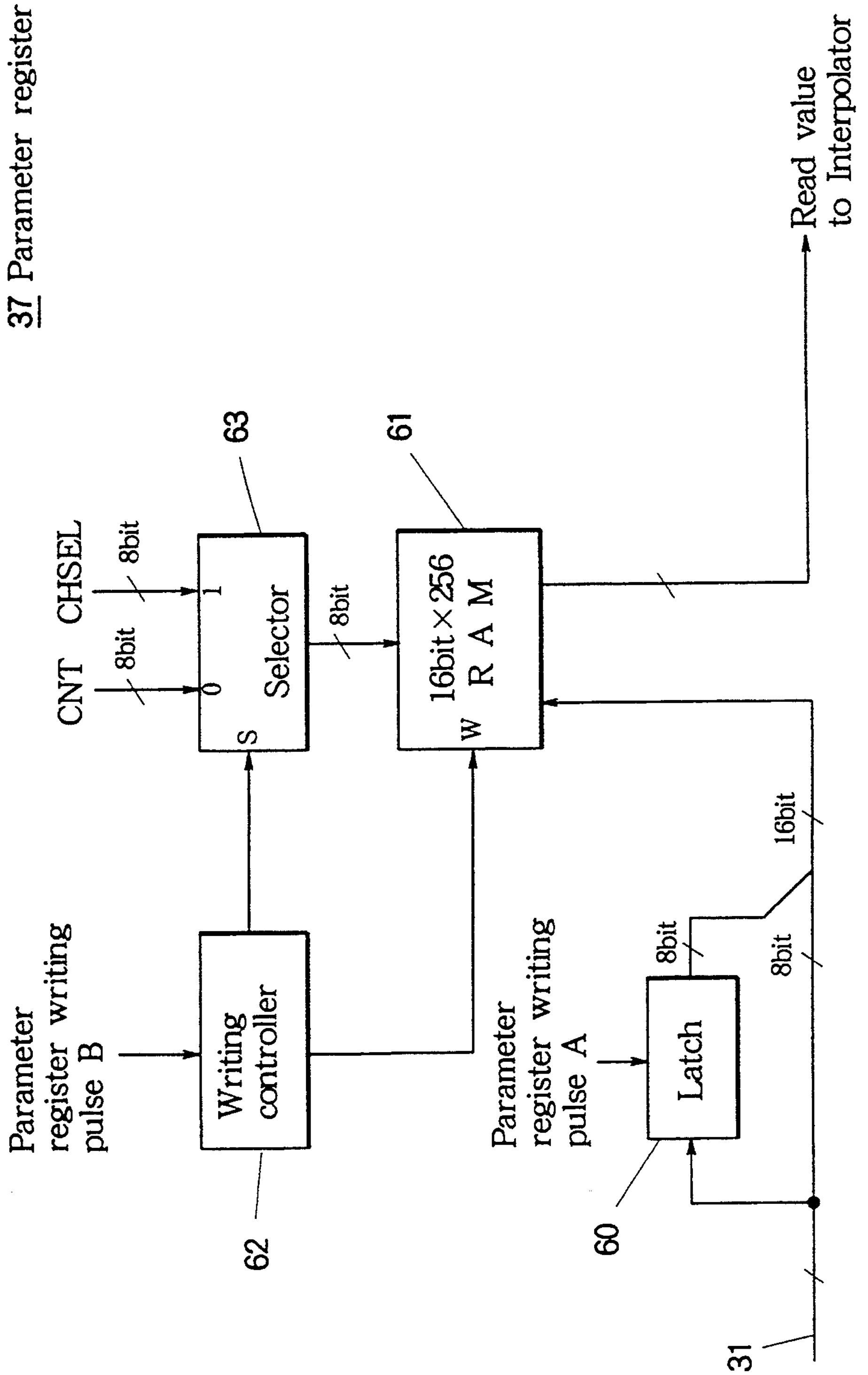
FIG. 4 is a detailed block diagram showing a parameter register provided in the DSP.

FIG. 4 shows a detailed block diagram of the parameter register 37. This register 37 is comprised of a RAM 61 which memorizes each of the parameters utilized in the 256 steps executed sequentially and cyclicly by the computation unit 33. The RAM 61 has a memory area of 16 bits×25 locations. The RAM 61 has a data input terminal connected to the CPU interface 30 (FIG. 2) through the interface bus line 31 and connected to an output terminal of a latch 60. An input terminal of the latch 60 is connected to the (CPU interface 30 through the interface bus line 31 in manner similar to the RAM 61. The latch 60 operates to convert sequentially a serial pair of 8-bit data fed from the CPU 10 through the interface bus line 31 into a 16-bit parameter value. Namely, the 16-bit parameter value is initially fed from the CPU 10 in the form of a serial pair of upper order eight bits and lower order eight bits. When the parameter register 37 receives the upper order eight bits of each parameter value, the latch 60 momentarily latches the received upper order eight bits. When the subsequent lower order eight bits are received, the upper order eight bits held in the latch 60 are written into the RAM 61 concurrently with the lower order eight bits, thereby achieving 8/16 bit conversion. For this. the latch 60 and the RAM 61 receive separate writing pulses A and B. Namely, the parameter register writing pulse A is fed to the latch 60 when the preceding eight bits are received, thereby latching the same. Then, the other parameter register writing pulse B is fed to the RAM 61 when the succeeding eight bits are received, hence the RAM 61 latches this succeeding eight bits together with the preceding eight bits latched in the latch 60, into an assigned memory area to thereby record the 16-bit parameter value. These writing pulses A, B are generated by the aforementioned writing pulse generator 58 (FIG. 3) in synchronization with an input timing of sequential eight-bit data. The parameter register writing pulse B is applied to the RAM 61 through a writing controller 62, while the parameter register writing pulse; A is directly applied to the latch 60. On the other hand, an output terminal of the RAM 61 is connected to the interpolator 39.

Reading/writing addresses are applied to the RAM 61 through a selector 63. The selector 63 is inputted with the step count CNT fed from the counter 42, and the channel select signal CHSEL fed from the channel latch 53. The step count CNT is utilized as the reading address of the RAM 61, while the channel select signal CHSEL is used as the writing address of the RAM 61. The selector 63 applies either of CNT and CHSEL to the RAM 61 according to a select signal fed from the writing controller 62. Since the counter 42 (FIG. 2) carries out the counting operation in synchronization with progression of the computation steps of the computation unit 33, the step count CNT from the counter 42 is utilized to address the RAM 61 to read out the respective parameters in response to the corresponding steps executed by the computation unit 33.

On the other hand, the signal CHSEL is fed from the channel latch 53. Prior to the writing operation of the RAM 61, the CPU 10 operates to write into the latch 53 a step number effective to designate a particular step involving a parameter to be rewritten. After this, the aforementioned writing pulses A and B are generated to effect the writing operation of the RAM 61 so that a new value of parameter is correctly written into a memory area of the RAM 61 specified by the step number.

The writing controller 62 produces the select signal, normally effective to select CNT, and momentarily effective to select CHSEL when the CPU 10 operates to write a new value of a given parameter into the RAM 61, in synchronization with the writing pulses A, B. This momentary writing operation is executed interruptively without disturbing regular continuous reading of the parameters from the RAM 61 by CNT.

FIG. 5 shows a detailed block diagram of the interpolation controller 38. This controller 38 watches progression of the computation steps in the computation unit 33. When the designated step is executed, the interpolation controller 38 produces responsive signals and provides the interpolation rate. The controller 38 includes the step latch 71 which is divided into sixteen channel sections for storing at most, sixteen different step numbers. The controller 38 further includes the interpolation rate latch 70 which is also divided into sixteen channel sections for storing, at most sixteen interpolation rates. The step latch 71 is connected to the CPU interface 30 (FIG. 3) to memorize the designated computation step for each interpolation channel, as described before. The interpolation rate latch 70 is connected to the CPU interface 30 for memorizing the interpolation rates contained in the command data from the CPU, as described before. The writing controller 81 applies a writing pulse to the interpolation rate latch 70. The other writing controller 82 applies a writing pulse to the step latch 71. The writing controller 81 receives the channel select signal CHSEL and an interpolation rate writing pulse fed from the writing pulse generator 58 (FIG. 3). The writing controller 81 operates based on these signal and pulse to output a writing pulse which assigns a particular channel section of the latch 70 at a given timing synchronously when the interpolation rate is delivered to the interface bus line 31. On the other hand, the writing controller 82 receives the channel select signal CHSEL and a designated step writing pulse fed from the writing pulse generator 58 (FIG. 3). The writing controller 82 operates based on these signal and pulse for outputting a subsequent writing pulse which assigns a particular channel section of the step latch 71 at a given timing. This writing pulse from the writing controller 82 is also inputted into a latch 75 which is also divided into sixteen channel sections correspondingly to the sixteen interpolation channels.

A comparator 73 is connected to the step latch 71 to receive therefrom the latched step number. The comparator 73 is also divided into sixteen parallel channels corresponding to the sixteen sections of the latch 71. Each channel of the comparator 73 compares the designated step number with the step count CNT which indicates a current computation step. When the designated step number coincides with the current CNT in any of the comparator channels, the comparator 73 generates a coincidence signal. This coincidence signal is distributed to those of encoder 74 and coincidence detector 78, as well as to a clear terminal C of a latch 75 and to a control terminal of a 16-channel gate 76.

The encoder 74 encodes the coincidence signal to convert an attending channel number into a 4-bit binary data ICH indicative of an attending interpolation channel. This data ICH is fed to the selector 72 as well as to the interpolator 39. The selector 72 outputs to the interpolator 39 a signal IRATE which represents the interpolation rate retrieved from the interpolation rate latch 70, for use in the attending channel identified by ICH. The coincidence detector 78 operates in response to the coincidence signal for feeding a coincidence pulse IP to the interpolator 39 (FIG. 2). The coincidence pulse IP is generated by the detector 78 everywhen the coincidence signal is issued from the respective channels of the comparator 73. The coincidence detector 78 feeds every coincidence pulse IP to a common line regardless of the multiple channels.

The 16-channel latch 75 is connected to a writing detector 77 through the 16-channel gate 76. When the step latch 71 receives the writing pulse at one of the channel sections from the writing controller 82, the same writing pulse is latched to a corresponding channel section of the latch 75. The latched pulse is passed to the writing detector 77 when the gate 76 is made open by the first coincidence signal outputted from the comparator 73. The first coincidence signal is outputted when the designated step number coincides with the step count CNT for the first time in an initial cycle of the interpolation operation after the writing pulse is generated. The writing detector 77 operates when the pulse is inputted for providing a parameter updating pulse CC to the interpolator 39. The parameter updating pulse CC is commonly generated by the writing detector 77 regardless of the channels. In this operation, as described before, the coincidence signal of the comparator 73 is fed to the clear terminal of the latch 75 and to the control terminal of the gate 76, so that the latch 75 is cleared by a trailing edge of the pulsive coincidence signal, and the gate 76 is triggered by a leading edge of the pulsive coincidence signal. Therefore, only when the comparator 73 outputs a coincidence signal immediately after the writing controller 82 outputs a writing pulse, this first coincidence signal is exclusively passed to the writing detector 77. Consequently, the parameter updating pulse CC is provided only when the first coincidence pulse IP is transmitted immediately after the step number is written into the step latch 71. This parameter updating pulse CC is delivered to the interpolator 39 to cancel a previous or old parameter value memorized therein and to set, as an initial value, the present parameter associated to the newly designated step.

Figure 6:
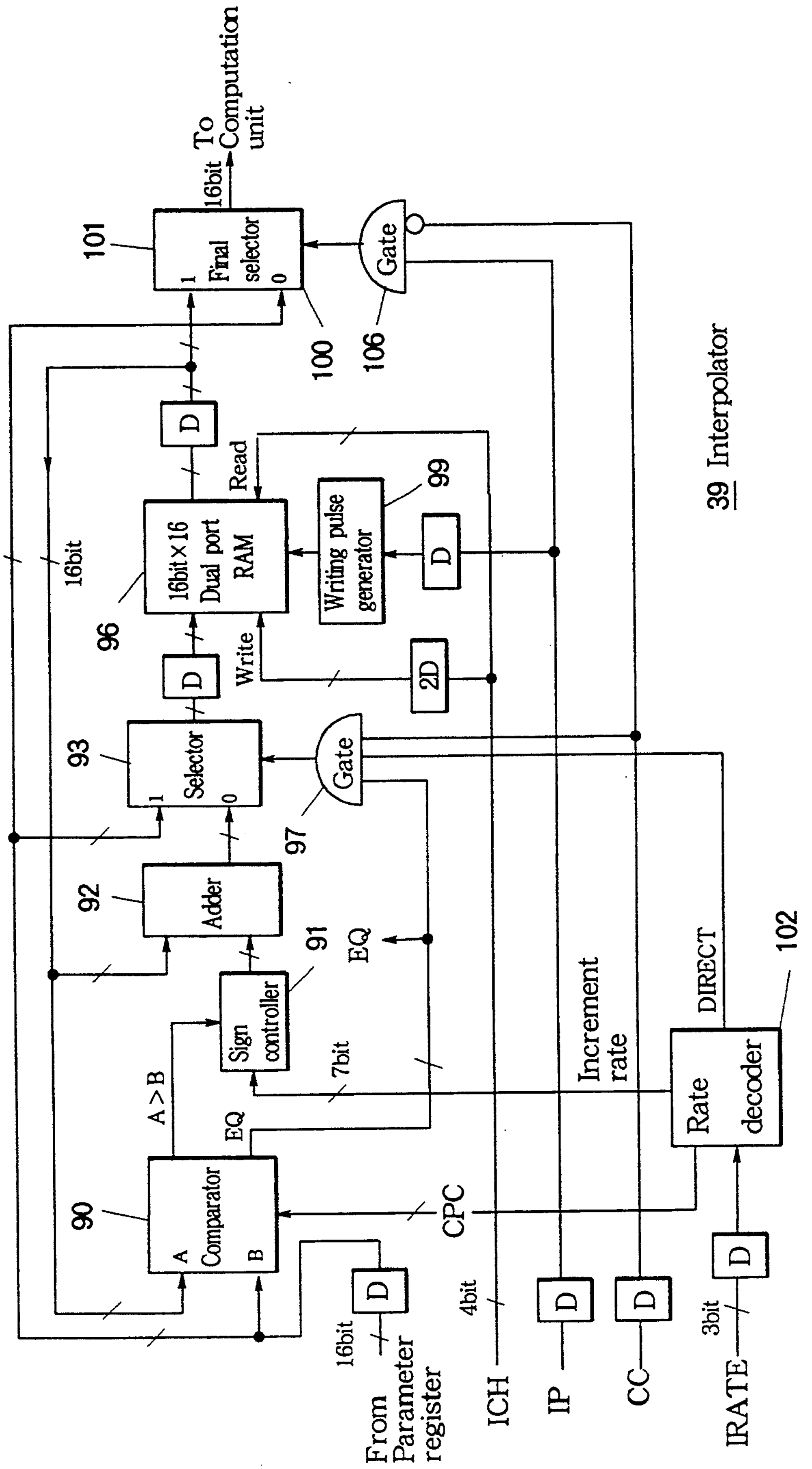
FIG. 6 is a detailed block diagram showing an interpolator provided in the DSP.

FIG. 6 shows a detailed block diagram of the interpolator 39. The parameter values inputted from the parameter register 37 are delivered to those of a comparator 90, a selector 93 and an input terminal "0" of a final selector 101. Another input terminal "1" of the final selector 101 is connected to a dual port RAM 96 through a delay D. The final selector 101 operates when a selecting signal is absent. (non-interpolation period) for opening the input terminal "0" thereof to directly feed the parameter value read from the parameter register 37 to the computation unit 33 (FIG. 2). The final selector 101 operates when the selecting signal is present (interpolation period) for opening the input terminal "1" thereof to pass an interpolated value in the dual port RAM 96 to the computation unit 33.

A gate 106 is connected to a select signal terminal of the selector 101. The gate 106 receives the coincidence pulse IP and an inverted one of the parameter updating pulse CC Consequently, the value of the parameter inputted from the parameter register 37 is directly transmitted as it is to the computation unit 33 during either of the non-interpolation period in which the coincidence pulse IP is not issued, and a first cycle of the interpolation period in which both of the coincidence pulse IP and the parameter updating pulse CC are issued. Accordingly, at the first cycle of the interpolation period, the old value of the parameter to be interpolatively updated is provided to the computation unit only once through the final selector 101, for use in the computation the designated step. Concurrently, the old value is also written, as a start value, into a channel section of the dual port RAM 96, specified by ICH under the control of selector 93 as will be described later. At the second and further cycles of the interpolation period in which the coincidence pulse IP is successively issued while the parameter updating pulse CC is no longer issued, the final selector 101 transmits an intermediate value of the parameter from the dual port RAM 96 to the computation unit 33 through a one cycle delay.

The incremental interpolation of the parameter to a target value is carried out by means of comparator 90, sign controller 91, adder 92, selector 93, dual port RAM 96, writing pulse generator 99 and plurality of delays provided for timing adjustment of various signals. The comparator 90 compares a current intermediate parameter value A fed back from the dual port RAM 96 with the target parameter value B which is the new parameter value fed forward from the parameter register 37. The comparator 90 outputs the end signal EQ when the current value A substantially reaches the target value B, and outputs a negative sign signal A>B when the current value is greater than the target value B. The comparator 90 receives a control data CPC from a rate decoder 102. The control data CPC denotes an increment rate, and the comparator 90 issues the end signal EQ when the difference between the current value A and the target value B (updated new value) becomes smaller than the increment rate, so as to avoid overrun. The rate decoder 102 receives the interpolation race IRATE from the interpolation controller 38 (FIG. 2). The rate decoder 102 converts the interpolation rate into a binary increment rate with reference to a rate table shown in FIG. 7. The binary increment rate is supplied to the sign controller 91. If the interpolation rate IRATE denotes a full value "7" (111), it is commanded that the target or new value should be directly transmitted without the interpolation. Therefore, the rate decoder 102 issues a signal DIRECT instead of the increment rate. This signal DIRECT is fed to another gate 97.

In strict sense, the control data CPC denotes a critical bit having a binary value "1" in the increment rate picked up from the rate table of FIG. 7. During the course of the incremental interpolation of the parameter value based on the increment rate, lower order bits than the critical bit do not vary so that the comparator 90 carries out the comparison with respect to higher order bits than the critical bit. When the critical bit of the current value A coincides with chat of the target value B, the end signal EQ is issued while disregarding the value of the lower order bits. On the other hand, the comparator 90 issues the negative sign signal A>B only when the current value A is greater than the target value. The negative sign signal is applied to the sign controller 91. The sign controller 91 receives the increment rate from the rate decoder 102 as noted before. The sign controller 91 determines the sign of the increment rate dependently on presence or absence of the negative signet signal, and the signed increment rate is fed to the adder 92. When the negative sign signal A>B is present, the target value B is lower than the current value A so that the negatively signed increment rate is fed to the adder 92. On the other hand, when the negative sign signal A>B is absent, the target value B is upper than the current value A so that the positively signed increment rate is fed to the adder 92. Further, when the current value A is nearly equal to the target value B, the negative sign signal is not issued, but the end signal EQ is outputted to switch the selector 93. Accordingly, the increment rate is no longer effective and its sign does not matter.

The adder 92 receives the signed increment rate at one input terminal, and receives the current parameter value fed back from the dual port RAM 96 at another input terminal in manner similar to the A terminal of the comparator 90. Accordingly, the adder 92 produces an incremented intermediate parameter value added or subtracted with the increment rate at each cycle. This incremented, i.e., accumulatively interpolated parameter value is inputted into one input terminal "0" of the selector 93. Another input terminal "1" of the selector 93 receives the old or start parameter value from the parameter register 37. The OR gate 97 is connected to a select signal terminal of the selector 93. The OR gate 97 receives those of the parameter updating pulse CC, the signal DIRECT and the end signal EQ. When one of these signals is inputted into the OR gate 97, the selector 93 passes the parameter value directly from the parameter register 37 to a write data terminal of the dual port RAM 96. When any of these signals CC, DIRECT and EQ is absent, the accumulated result of the adder 92 is passed to the dual port RAM 96. When the parameter updating pulse CC is inputted, the interpolation computation is initiated at the assigned channel so that the selector 93 is switched to the input terminal 1 to load a start value of the involved parameter into the RAM 96 in place of an existing parameter value if any. The signal DIRECT corresponds to the maximum interpolation rate. When the signal DIRECT is issued, the start value (old value) is instantly switched to the target value (new value) without progressive interpolation. For this, the selector 93 is switched to the input terminal "1" in response to the signal DIRECT to pass the new value from the parameter register 37 at the first cycle of the interpolation immediately after rewriting of the parameter value. Further, when the end signal EQ is issued, the new or target value is taken into the dual port RAM 96 to finish the incremental interpolation cycle. Thereafter, the new value is continuously fed to the computation unit 33 every cycle.

The dual port RAM 96 receives a writing pulse generated by a writing pulse generator 99 based on the coincidence pulse IP. Further, the writing address and the reading address of the dual port RAM 96 are determined by the signal ICH fed from the encoder 74 of the interpolation controller 38 (FIG. 5). In order to store the incremented value into the same address, the writing address is delayed two timings relative to the reading address. When the comparator 90 issues the end signal EQ, the stepwise interpolation is terminated. In the above embodiment, various delay elements are suitably incorporated for synchronizing operation timings of the various parts. These delays may be timed by the sampling clock of the tone signal, the CNT clock, or the system clock ∠.

Returning back to FIG. 3, as mentioned briefly before, the latch 54 of the CPU interface 30 receives the end signal EQ. The latch 54 is divided into sixteen parallel bits corresponding to the interpolation channels. An output of the latch 54 is connected to an input of the selector 55. The selector 55 is connected to the address decoder 57, and is controlled by the decoder 57 to select either of higher order eight bits or lower order eight bits of the 16-bit latch 54. The selected eight bits are stored in the buffer 56. The stored data of the buffer 56 is read out by the CPU 10 according to the enabling signal fed from the I/O controller 51. By this the CPU 10 judges which interpolation channel finishes the interpolation process.

By such a construction of the DSP 21, a particular parameter is selected by the acoustic effect command data among all the parameters used in the respective computation steps of the microprogram. The selected parameter value is varied by the stepwise interpolation, and is then fed to the computation unit 33 to achieve gradual and transient updating of the selected parameter value. The operation of the DSP 21 will be described hereinbelow in time sequential manner. At the time of power-on, or timbre presetting, or acoustic effect selecting prior to musical performance, all of the parameters are successively preset in the RAM 61 for use in respective ones of the 256 computation steps while a microprogram is loaded according to the desired acoustic effect. This presetting is carried out by inputting the individual parameters into the 0-th to 256-th memory locations of the RAM 61. The DSP 21 starts operation in response to initiation of musical performance. The computation unit 33 applies the computation process to the waveform data of the musical tone signal fed from the input register 36 and transmits the processed waveform data to the DAC 23 through the output register 44. The computation unit 33 carries out the computation process according to the microprogram loaded in the memory 43, using the parameters supplied from the interpolator 39. During the process, one of the sixteen channels is assigned to a particular parameter which is to be updated in read time basis by means of an operating piece such as à pedal or a wheel, and which is used in a designated one of 256 steps of the computation process. Further, the interpolation command data is set to the interpolation controller 38 such that the designated step number and a given interpolation rate inputted by the operating piece are stored in the respective latch sections corresponding to the assigned channel. Preferably, all the parameters to be concurrently updated in real time basis should be progressively interpolated in parallel manner in order to avoid sudden change from the old value to the new value, which would generate click noise or else. Therefore, the interpolation command data may be set for all the parameters to be concurrently updated through at most sixteen number of the channels. If the number of the selected parameters exceeds the number of available channels, the CPU 10 may carry out the interpolation for a part of the selected parameters instead of the interpolator. Alternatively, the progressive interpolation may be suspended for rather moderately changing parameters.

When the operation piece such as the pedal and wheel is actuated during the course of the performance, the CPU 10 produces a new value of the parameter selected by the operation piece according to the actuation amount of the operation piece. The new value is written into the parameter register at a corresponding step location. The written new value is not instantly fed to the computation unit, but the old value is progressively approached to the new value through the assigned interpolation channel during the cyclic feeding of the selected parameter to the computation unit. Therefore, the CPU 10 can rewrite the old value to the new value even if the difference therebetween is rather great.

In modification, the parameter value may be automatically varied according to a preset time table, from a specific time point such as top or end point of a musical tone, rather than varying the parameter value by means of the operation piece. For example, in a known envelope generator using an interpolator, the CPU controls each state of an envelope in time-sequential manner. In such a case, at the start point of each state, a changing rate and a target value preset for the state are utilized as the interpolation rate and the new parameter value, respectively, and are loaded into the DSP. After the progressive interpolation of the parameter value is finished, the CPU 10 receives the signal EQ from the latch 54 to detect an end point of the current state. Then, the processing shifts to a next state of the envelope. Further, with regard to the assignment of channels to the respective parameters, some of the channels may be provisionally assigned to particular parameters associated to various tone colors and acoustic effects prior to the start of performance, while the remaining channels may be assigned to other parameters controlled by the operation piece in real time basis.

In this embodiment, the interpolator 39 is provided with 16 channels which can be operated in parallel manner. Further, the designated steps can be freely assigned to vacant ones of the sixteen channels in random manner. The interpolator 39 can execute interpolation operation of, at most, sixteen steps within one cycle of the 256 steps. Therefore, during other than the working period of the interpolator 39, the involved arithmetic elements such as an adder and a comparator call be utilized for supplementing the computation unit 30. Such a modification can be realized by modifying the microcodes. In this case, the working status of the interpolator channel can be detected by checking presence or absence of the coincidence pulse IP.

As described above, according to the invention, a desired number of the different parameters can be selectively interpolated in efficient manner during the transient period to realize the updating of the multiple parameters in real time basis, while saving a hardware construction of the DSP.

What is claimed is:

1. A signal processing apparatus comprising:
   - computation means for executing computation processing of a waveform of a given signal, using a plurality of parameters;
   - register means for registering values of the respective parameters;
   - designating means for designating at least one of the parameters;
   - rewriting means for rewriting the designated parameter from an old value to a new value; and
   - interpolation means for feeding to the computation means an intermediate value of the designated parameter, which is interpolated progressively from the old value to the new value,
   - wherein the interpolation means includes means defining a multiple of interpolation channels, a number of which is less than a total number of the parameters, and means for selectively assigning the designated parameter to one of the interpolation channels to carry out interpolation of the designated parameter.

2. An apparatus for imparting a variable acoustic effect to a musical tone signal, comprising:
   - computation means for repeatedly executing a cycle of computation steps applied to the musical tone signal, using a plurality of parameters so as to realize a desired acoustic effect;
   - register means for registering values of the respective parameters which are used individually in corresponding computation steps;
   - designating means operative when a variation is requested in the acoustic effect for designating at least one registered parameter attributive to the requested variation;
   - rewriting means for rewriting the designated parameter from an old value to a new value; and
   - interpolation means responsive to the execution of the computation steps each cycle during a transient period of the variation for feeding synchronously to the computation means an intermediate value of the designated parameter, which is interpolated progressively from the old value to the new value, to thereby ensure the smooth variation in the acoustic effect,
   - wherein the interpolation means includes means defining a multiple of interpolation channels, and means for assigning a multiple of concurrently designated parameters freely to the interpolation channels so as to carry out parallel interpolation of the designated parameters.

3. An apparatus according to claim 2; wherein the interpolation means includes adder means for accumulatively adding a given incremental fragment each cycle to a current value of the designated parameter so as to calculate successively the intermediate value.

4. An apparatus according to claim 2; wherein the interpolation means includes means for releasing an assignment of each interpolation channel when the intermediate value reaches the new value of the designated parameter assigned to each interpolation channel.

* * * * *